Figure 1:
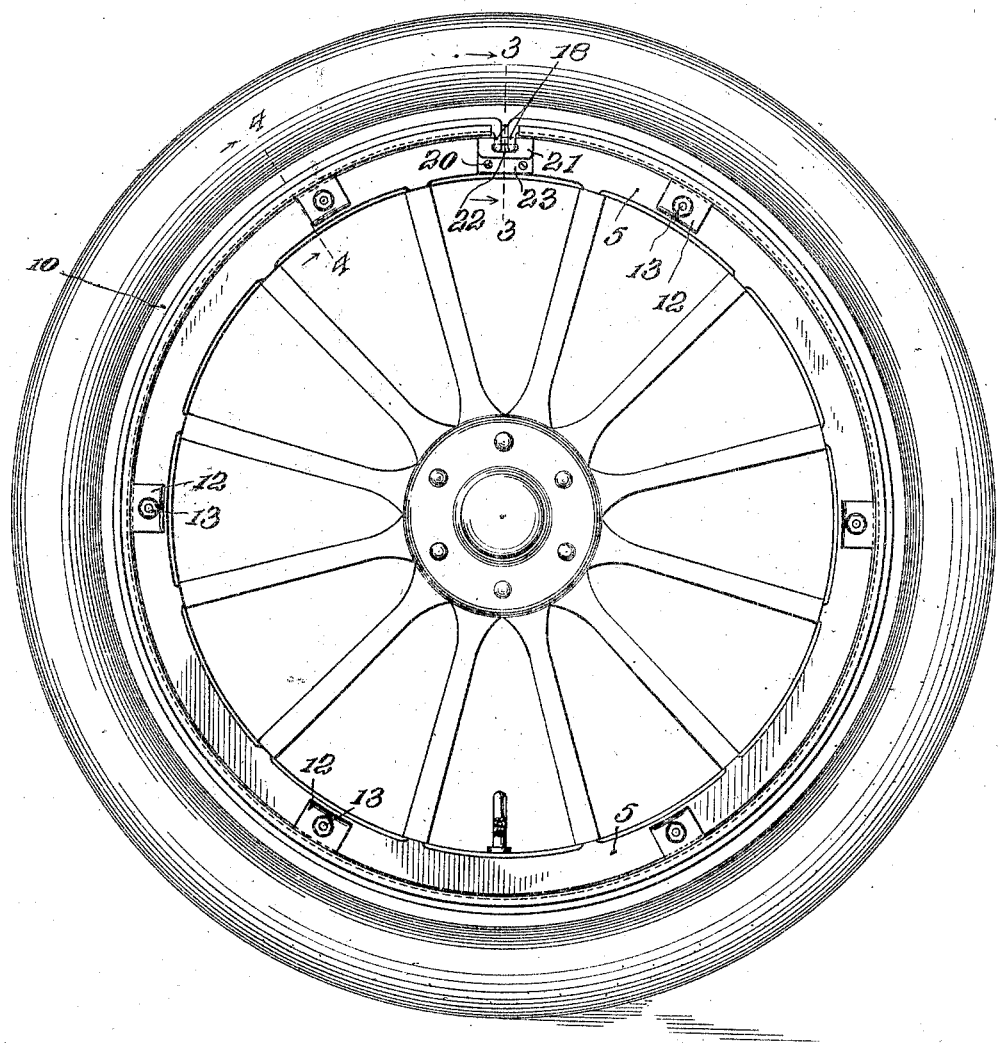

A. DOW.
MEANS FOR LOCKING DETACHABLE FLANGES ON DEMOUNTABLE RIMS.
APPLICATION FILED MAY 5, 1910.

967,115.

Patented Aug. 9, 1910.

2 SHEETS—SHEET 1.

Witnesses:
Edward Rowland
H. A. Murray

Inventor
Alexander Dow
By his Attorneys
Dudley, Browne & Phelps

A. DOW.
MEANS FOR LOCKING DETACHABLE FLANGES ON DEMOUNTABLE RIMS.
APPLICATION FILED MAY 5, 1910.
967,115.
Patented Aug. 9, 1910.
2 SHEETS—SHEET 2.
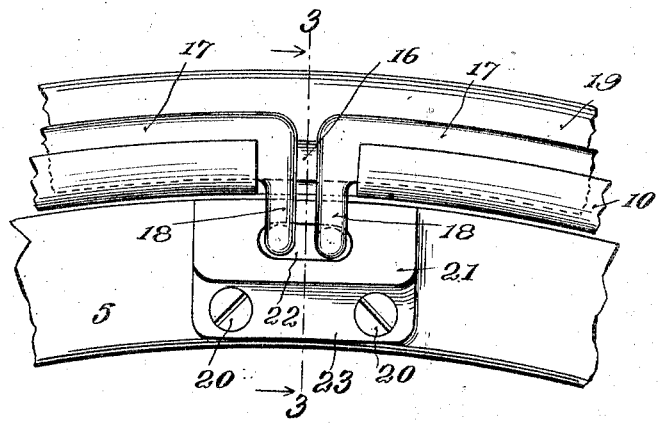
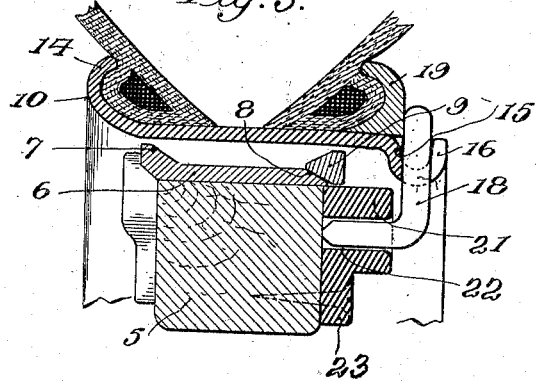
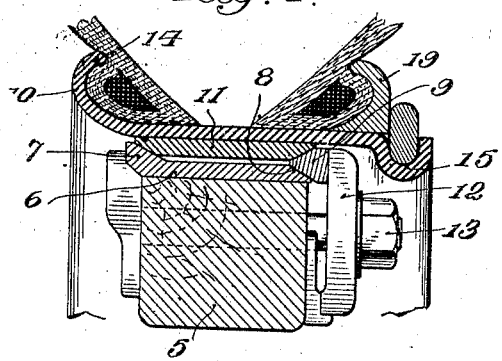
Witnesses:
Edward Rowland
Helen A. Murray
Inventor
Alexander Dow
By his Attorneys
Dudley Brown Phelps

UNITED STATES PATENT OFFICE.

ALEXANDER DOW, OF NEW YORK, N. Y., ASSIGNOR TO DOW RIM COMPANY, OF NEW YORK, N. Y., A CORPORATION OF NEW YORK.

MEANS FOR LOCKING DETACHABLE FLANGES ON DEMOUNTABLE RIMS.

967,115.  Specification of Letters Patent.  Patented Aug. 9, 1910.

Application filed May 5, 1910. Serial No. 559,523.

*To all whom it may concern:*

Be it known that I, ALEXANDER DOW, a citizen of the United States, residing at New York, in the county of New York and State of New York, have invented certain new and useful Improvements in Means for Locking Detachable Flanges on Demountable Rims, of which the following is a specification.

My invention relates to means for locking detachable flanges on demountable rims, whereby the flanges are prevented from becoming loose on the rim, flying off and releasing the tire secured thereby.

My invention is applicable to substantially any of the well known types of detachable flange when applied to a demountable rim.

While my invention may be used in connection with substantially any detachable flange, I have shown the same, in order to illustrate my invention, when used in connection with what is known as the Standard universal quick detachable rim, in which the detachable flange is retained in position by a split ring which contracts around the rim of the wheel to secure the detachable flange onto the rim.

The form of demountable rim which I have illustrated is that known as the Firestone demountable rim, in which the under side of the demountable rim is provided with oppositely arranged wedge surfaces, and there is provided a corresponding wedge surface on the fixed portion of the rim with which one of the wedge surfaces on the demountable rim contacts, and there is also provided a ring having a wedge shaped side adapted to contact with the other wedge surface of the demountable rim. Plates are used to secure the wedge ring in position, the plates being secured to the fixed rim by suitable securing means, such as bolts. It is evident, however, that the use of my invention is not to be limited to the form of demountable flanges or to the form of demountable rims herein shown and described, but my invention may be applied to any well known or desired rim to which it may be found applicable.

My invention consists in certain constructions, combinations and arrangements of parts, one form of which will be first described in connection with the accompanying drawings and then the invention particularly pointed out in the appended claims.

Referring to the drawings wherein the same part is designated by the same reference numeral wherever it occurs, Figure 1 is a side elevation of a wheel provided with an embodiment of my invention; Fig. 2 is a detailed side view of the locking means for the ends of the split-retaining ring, the same being shown on a larger scale than Fig. 1; Fig. 3 is a section taken on line 3, 3 of Figs. 1 and 2 and Fig. 4 is a section taken on line 4, 4 of Fig. 1.

5 designates a felly which is shown as having attached thereto a felly band 6, one side of which is formed into an upwardly turned flange 7, which forms a wedge. The side of the felly band 6 opposite that carrying the wedge 7 is beveled off, as shown at 8, to form a bearing for one side of the wedge shaped locking ring 9.

10 is a demountable rim to the under side of which are secured the plates 11, having their opposite edges beveled off to engage with the incline sides 7 and the upper edge of the retaining ring 9. The ring 9 is held in position by means of a series of plates 12 which are secured to the fixed rim by means of the bolts 13.

The construction so far described forms no part of my invention, as it is what is known in the trade as the Firestone demountable rim, and is merely shown as illustrating one form of demountable rim to which my invention may be applied.

The rim 10 is shown as turned up at one side to form a permanent tire-retaining flange 14, and on the opposite side of the rim a depression or channel 15 is formed having an opening 16 at one portion of the circumference of the rim.

17 is a retaining ring which is split and has its ends formed in the inwardly projecting hooks 18.

19 is a detachable tire-retaining flange which slips over the edge of the rim and is held in place by the retaining ring 17, which fits into the channel 15 with the hook ends 18 of the ring extending through the openings 16. Except for the opening 16 and the hook ends 18 the construction is that of the well known Standard universal quick detachable rim, and forms no part of my invention. In order to lock these retaining flanges in position and also prevent the ring from becoming accidentally detached I provide the felly with an opening which is adapted to be engaged by the hooks on the ends of the retaining ring when the rim is placed on the felly so as to lock the ends of the ring. In the form of my invention shown this is effected by providing the felly 5 with a plate 23 secured to the felly by means of the screws 20, said plate being provided with the boss 21 having the oblong slot or opening 22 cut therein. When the demountable rim is placed in position on the felly in the ordinary manner and pushed transversely of the felly to its seat the hook ends 18 will enter the opening 22, whereby the ends of the split ring will be locked on to the rim. The ring can only be removed after the rim has been demounted.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In a wheel, a fixed member, a demountable rim therefor, means to secure the rim to the fixed member, a split ring on the rim, and locking means on the end portions only of the split ring and on the fixed member adapted to be brought into locking engagement when the rim is slipped by a transverse movement only to its proper position on the fixed member.

2. In a wheel, a fixed member, a demountable rim therefor, means to secure the rim to the fixed member, a split ring on the rim, and means for locking the ends of the split ring to the fixed member, comprising an opening formed in one part, and a projecting portion carried by the other part which are adapted to be brought into locking engagement when the rim is slipped by a transverse movement only to its proper position on the fixed member.

3. In a wheel, a fixed member, a demountable rim therefor, means to secure the rim to the fixed member, a split ring on the rim, a hook formed on one end of the ring, the fixed member being provided with an opening with which the hook engages when the rim is secured on the fixed member and means for locking the other end of the ring in position.

4. In a wheel, a fixed member, a demountable rim therefor, means to secure the rim to the fixed member, a split ring on the rim, an inwardly projecting hook formed on each end of the ring, the fixed member being provided with an opening with which the hooks engage when the rim is secured on the fixed member.

In testimony whereof I affix my signature in presence of two witnesses.

ALEXANDER DOW.

Witnesses:
HELEN KINNEY,
WM. F. SMAIL.